United States Patent
Van der Velde (12)

(10) Patent No.: US 6,435,208 B1
(45) Date of Patent: Aug. 20, 2002

(54) FLAME-RETARDANT PRESSURE EQUALIZING VALVE

(76) Inventor: Ide Albert Van der Velde, IJsselstraat 2, Winschoten (NL), 9673 CX ( * ) Notice: Subject to any disclaimer, the term of this patent is extended or adjusted under 35 U.S.C. 154(b) by 0 days.

(21) Appl. No.: 09/142,121

(22) PCT Filed: Mar. 3, 1997

(86) PCT No.: PCT/NL97/00103

§ 371 (c)(1),
(2), (4) Date: Oct. 27, 1998

(87) PCT Pub. No.: WO97/32146

PCT Pub. Date: Sep. 4, 1997

(30) Foreign Application Priority Data

Mar. 1, 1996 (NL) .............................. 1002502

(51) Int. Cl.$^7$ .............................................. F16K 17/04
(52) U.S. Cl. ............................. 137/516.27; 137/525.27; 137/543.21
(58) Field of Search ....................... 137/516.25, 516.27, 137/543.21, 525.27

(56) References Cited

U.S. PATENT DOCUMENTS

| | | | | |
|---|---|---|---|---|
| 1,322,938 A | * | 11/1919 | Parker ............... | 137/516.27 X |
| 2,164,669 A | | 7/1939 | Thomas | |
| 2,431,769 A | * | 12/1947 | Parker ............... | 137/516.27 X |
| 3,054,422 A | * | 9/1962 | Napolitano ........ | 137/516.27 X |
| 3,457,949 A | * | 7/1969 | Coulter .............. | 137/516.27 X |
| 3,999,571 A | | 12/1976 | Pedersen et al. | |
| 4,890,640 A | * | 1/1990 | King, Sr. ........... | 137/516.27 X |
| 5,039,284 A | * | 8/1991 | Talaski .............. | 137/516.27 X |
| 5,092,361 A | * | 3/1992 | Masuyama et al. .... | 137/543.21 |
| 5,215,114 A | | 6/1993 | Breyer | |
| 5,465,752 A | * | 11/1995 | Higgins ............. | 137/516.27 X |

FOREIGN PATENT DOCUMENTS

| | | |
|---|---|---|
| DE | 93 20 973 U | 8/1995 |
| WO | WO 96 01962 | 1/1996 |

OTHER PUBLICATIONS

"High Velocity Venting Valve" Niikura, date unknown.
International Search Report for PCT/NL97/00103.
"High Velocity Venting Valve NC–10", Niikura Kogyo Co., Ltd., Pusan Korea, date unknown.

* cited by examiner

Primary Examiner—Michael Powell Buiz
Assistant Examiner—Meredith H. Schoenfeld
(74) Attorney, Agent, or Firm—Merchant & Gould, P.C.

(57) ABSTRACT

A flame-retardant pressure equalizing valve contains a valve body that is guided in a housing. Under the influence of excess pressure, the valve body is displaceable from a closing position into a blow-off position. The housing and the valve body form a first closure and, in a series therewith, a second closure. The surface of the second closure projected in the opening direction is larger than the surface of the first closure projected in the opening direction and the first closure opens during opening before the second closure, so that, during opening, the excess pressure acts on an enlarged surface and the valve is opened promptly. The second closure is spaced from the first closure in opening direction. As a result, a better closing behavior and an increased outlet velocity of the outflowing gas are obtained.

16 Claims, 4 Drawing Sheets

FLAME-RETARDANT PRESSURE EQUALIZING VALVE

Figure 1:
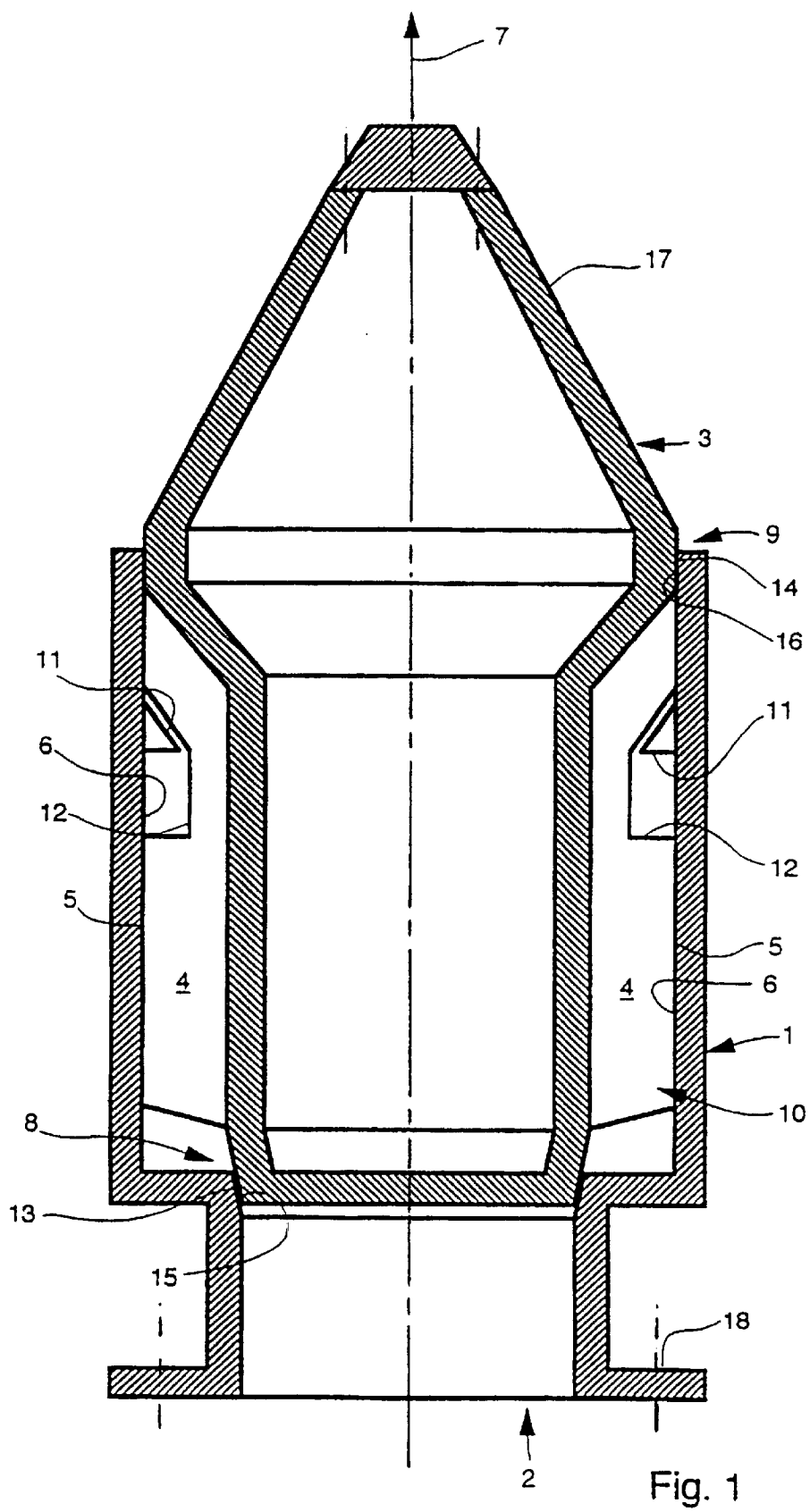

The invention relates to a flame-retardant pressure equalizing valve according to the preamble of claim 1.

A valve of this type is for instance known as a commercially available product from Niikura Kogyo Co. of Yokohama, Japan. Such valves are for instance used in the shipping industry for equalizing undue excess pressures and reduced pressures in load tanks of tankers. Such excess pressures and reduced pressures occur inter alia during the filling and emptying of the tanks and in the case of temperature variations resulting from changing environmental conditions. An important requirement imposed on such valves according to the standard MSC/Circ. 373 of IMO Resolution A.519(13) (constituting an implementation rule of regulation II-1/59.1.5 of the SOLAS treaty 1974) is that when the valve is opened, a gas velocity of 30 m/s be immediately attained and that this velocity be maintained until the valve closes again. This prevents the flame from being able to penetrate into the tank if blown-off gases inflame. During the aeration of a reduced pressure in the tank, it is important that a strong minimum air flow into the tank be present, so that no inflammable gases can escape from the tank. Hence, it is very important that the valve open very promptly and close very promptly. Such valves are generally referred to as "high-velocity vants".

With these known valves, a prompt opening is achieved utilizing the following principle. In closed condition, the force which, through relative excess pressure, is exerted on the valve body at the excess pressure side thereof, acts on a surface that is projected in opening direction and that is bounded by the circumferential edge of the first closure. When the relative excess pressure attains a value such that the closing force acting against the opening direction is exceeded, the valve body is displaced in opening direction and the valve opens along the first closure. Thus, the relative excess pressure also becomes active on the larger surface projected in opening direction and enclosed by the circumferential edge of the second closure. As a result, the force exerted on the valve body by the relative excess pressure suddenly increases, so that the valve is opened very promptly. As far as the prompt opening of the valve is concerned, the known valve is generally considered to be sufficiently effective.

A drawback of this known valve is that the valve body does not close at once, but tends to bounce up again during closing. This results in a temporarily intermittent gas flow of a low average velocity, which involves a substantial risk of a flame front backfiring via the valve. Further, the bouncing of the valve body causes considerable wear of the valve and an increased chance of leakage of the sealings along the closures.

Further, at given dimensions of the valve, a higher outlet velocity would be desirable, to enable highly inflammable gases to be brought, in a concentrated manner, at a greater distance from the valve and, accordingly, to further limit the danger of fire, explosion and poisoning, or, if the outlet velocity remains the same, to suffice with a more compact, lighter valve.

The object of the invention is to provide a pressure equalizing valve which, during closing, is less inclined to rebound and whereby, in comparison with existing valves, a higher outlet velocity of the gas is attained at the same relative excess pressure.

According to the present invention, this object is realized in that in a valve of the type indicated in the first paragraph, the second closure is spaced from the first closure in opening direction.

The fact that the valve according to the invention closes more properly, without rebound of the valve body, is attributed to the following effects.

During the closing of the valve, the measure in which the path of the still egressing gas changes on account of the valve body moving with the housing is relatively small, so that, when the valve closes, there is no or less increase of the force exerted on the valve body in opening direction.

Owing to the staggered position, in opening direction, of the first and the second closure relative to each other, the chamber thereinbetween has a greater length in opening direction. Thus, when the valve body is displaced through a particular distance, the relative volume change of the chamber between the first and the second closure is smaller than in the case of the known valve. This in turn results in that during the closing of the valve, which then, too, involves a still further decrease of the volume of the chamber between the first and second closures while the first and second sealings are already largely closed, 2 less abrupt increase of pressure occurs in this chamber than in the case of valves having first and second closures which, in opening direction, are located at the same level.

The relatively large volume of the air in the chamber between the first and the second closure further forms an accordingly large buffer providing that the velocity of the closing valve body is braked during the closing of the valve. As the chamber has a great length in opening direction, the valve body, after the closing of the second closure, can be braked very gradually over a large range, which prevents the valve body from rebounding. After the second closure has been closed again, the valve's slow further closing does not result in a temporarily low velocity, because the valve is then already closed along the outer closing edge thereof, so that, except for slight leakage, if any, along the second closure on the outlet side, no gas egresses anymore from the valve.

In the valve according to the invention, the path along which the gas passes, during blowing off, through the valve has considerably fewer changes of direction than in the case of the known valve, as the radial displacement of the gas towards the opened second closure is accompanied by a displacement of that gas in opening direction which is substantially parallel to the flow direction of the passage. As a result, the resistance experienced by the gas flowing out through the opened valve is, in turn, relatively slight, so that high outlet velocities are realized. A favorable, vertical through-flow of the outflowing gas through a large distance is further promoted in that the flow of the egressing gas is little turbulent and can hence penetrate far into the environment. The limited turbulence in the gas flow is further advantageous, because the danger of a flame front backfiring through the valve is thus further limited.

Figure 2:
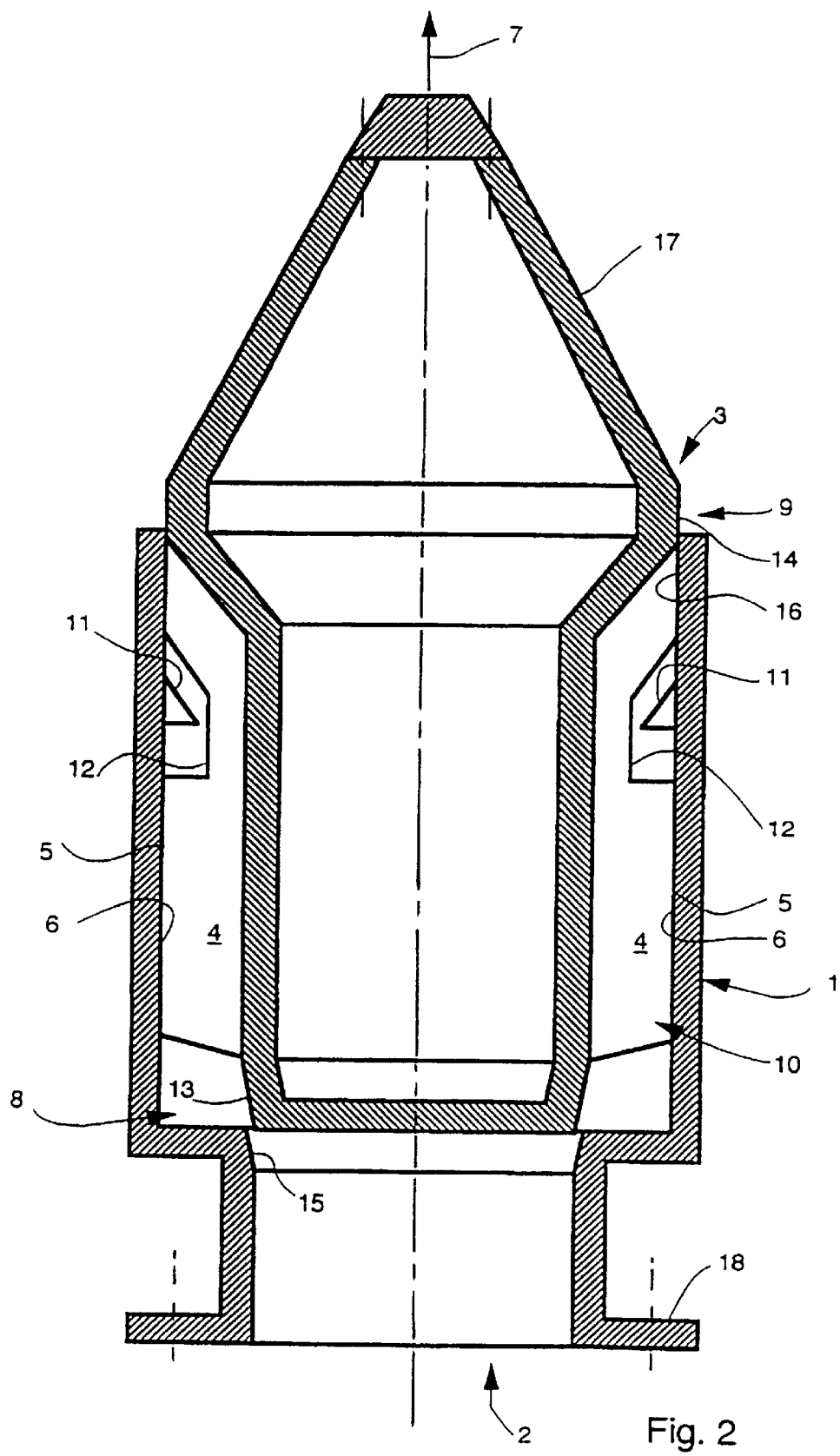
Figure 3:
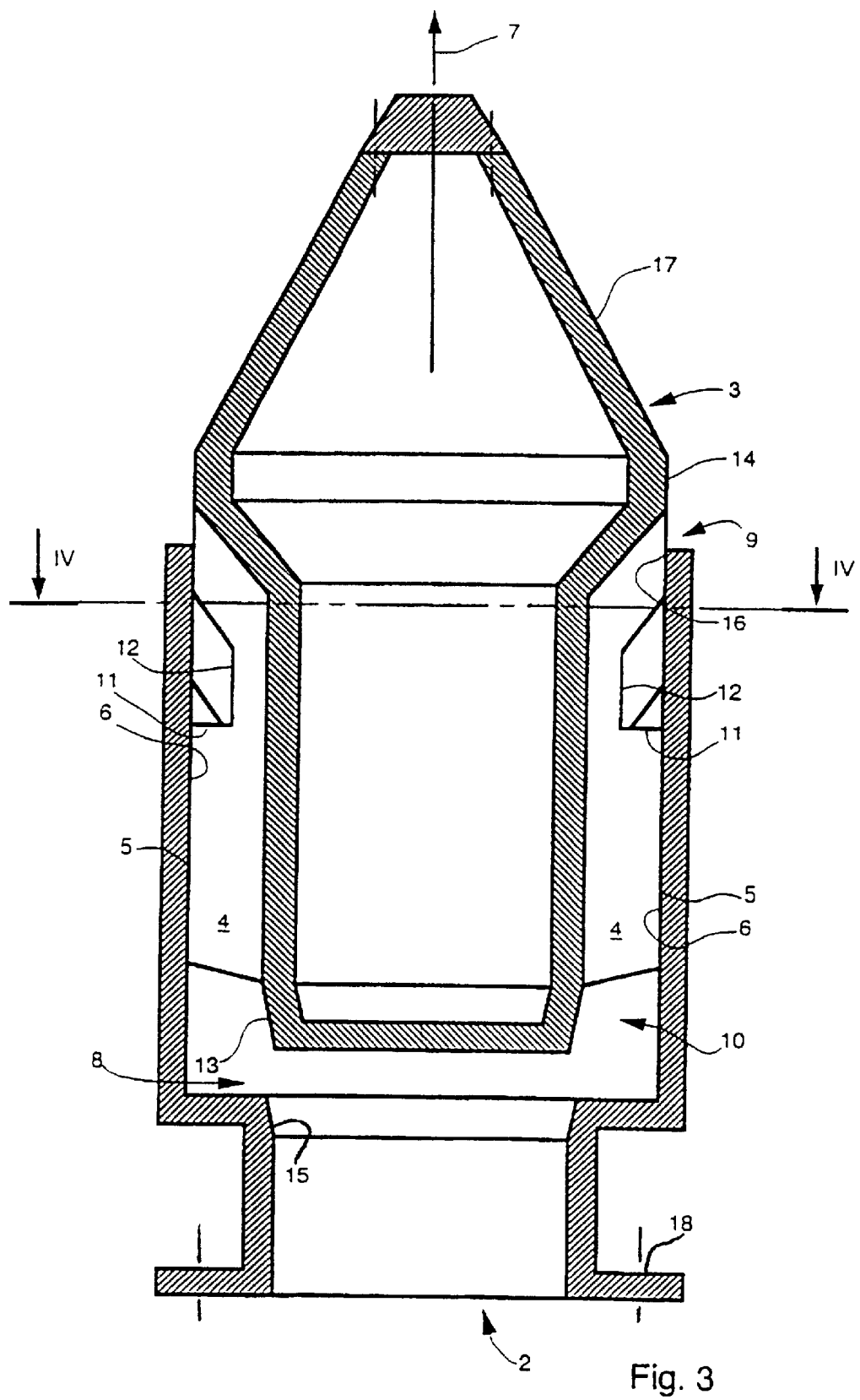
Figure 4:
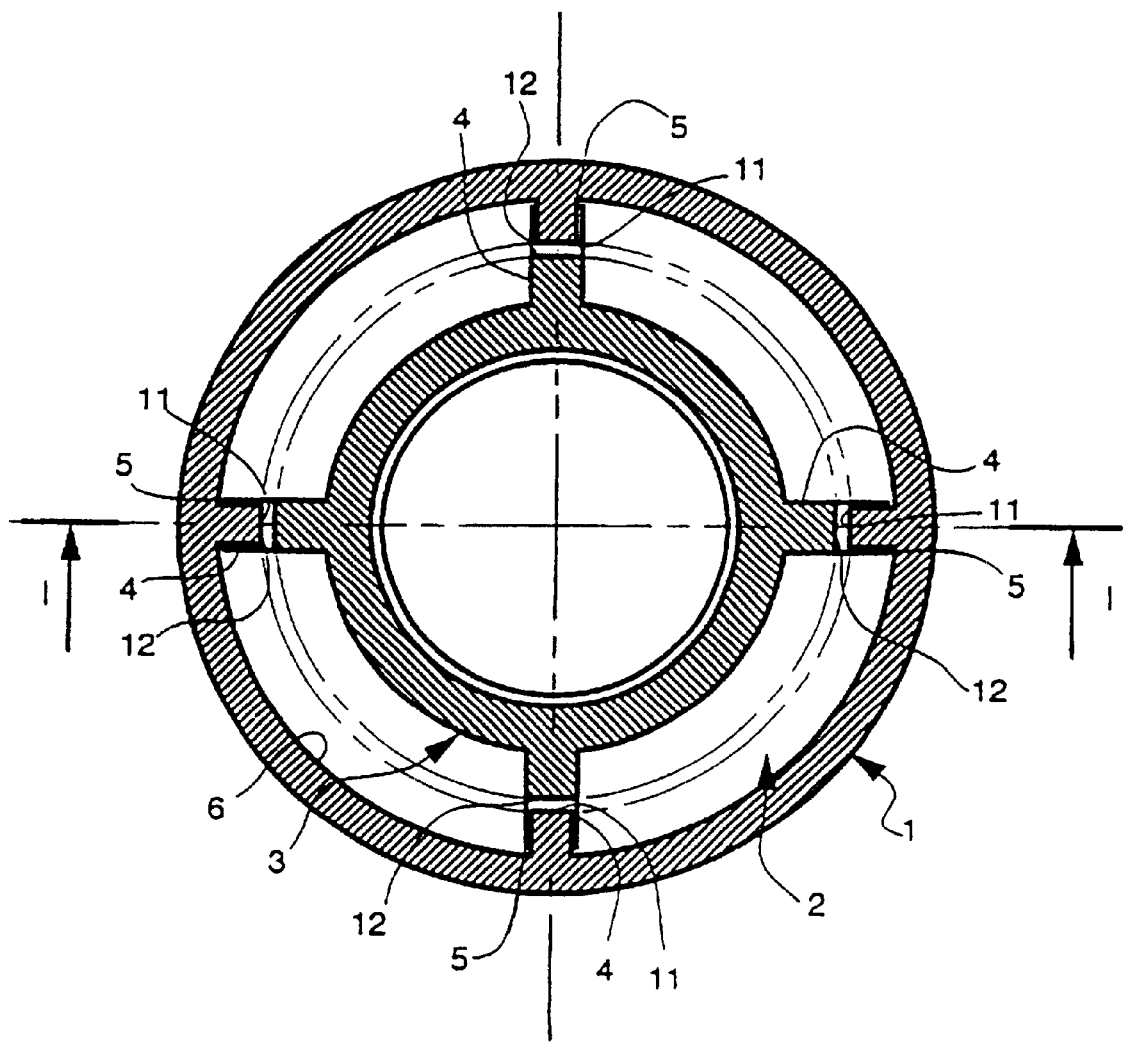

Hereinafter, the invention is further illustrated and explained on the basis of an exemplary moment that is most preferred at this moment and with reference to the accompanying drawings, in which:

FIGS 1–3 are sectional side views taken on the line I—I in FIG. 4 of a valve according to an exemplary embodiment of the invention in different operational conditions, and FIG. 4 is a sectional view taken on the line IV—IV in FIG. 3.

The flame-retardant pressure equalizing valve according to the exemplary embodiment shown is composed of a housing 1 having a passage 2 and a valve body 3. The valve body 3 is guided in the housing 1 by means of ribs 4, of which outer edges 3 about against a cylindrical inner wall 6 of the housing 1. In operational condition, in which the valve should approximately be mounted in the position shown in FIGS. 1–3, the valve body 3 can move relative to the housing 1, under the influence of excess pressure and against a closing force in the form of the weight of the valve body, from a closing position shown in FIG. 1 in an opening direction (arrow 7) to a blow-off position shown in FIG. 3.

In the closing position, the housing 1 and the valve body 3 form a first closure 8 of the passage 2 and, in series therewith, a second closure 9 of the passage 2 with a chamber 10 therebetween. In the cylindrical construction of the valve according to the exemplary embodiment shown, the chamber 10 between the first closure 8 and the second closure 9 is annular, except for interruptions formed by the radially directed ribs 4.

The surface projected in the opening direction 7 and enclosed by the circumferential edge of the second closure 9, is larger than the surface projected in the opening direction 7 and enclosed by the circumferential edge of the first closure 8. Further, the closures 8 and 9 are designed so that if the valve body 3 is in a transitional position between the closing position and the blow-off position in the housing 1, the first closure 8 is open and the second closure 9 is closed. In FIG. 2, the valve according to the present examplary embodiment is shown with the valve body 3 in this transitional position.

When the relative excess pressure in the passage 2 upstream of the first closure 6 increases so that the force exerted thereby on the bottom of the valve body 3 exceeds the weight of the valve body 3, the valve body is urged, against the action of gravity, into the position shown in FIG. 2. Because the first closure 8 is opened, the relative excess pressure can thereafter also penetrate into the portion of the passage 2 forming the chamber 10. As a result, the surface of the valve body 3 which surface is projected in the opening direction 7 and on which the excess pressure acts, is suddenly increased from a surface having a diameter equal to that of the passage below the first closure to a surface having a diameter equal to the inside diameter of the outer wall 6 of the housing 1 in the area of the chamber 10. This sudden, considerable increase of the surface of the valve body 3 on which the excess pressure acts results in the valve body 3 being displaced at a very high speed to the blow-off position shown in FIG. 3.

To prevent the valve body 3 from leaving the housing 1 during opening, the housing 1 comprises stop shoulders 11 cooperating with recesses 12 in the ribs 4. To prevent the valve body 3 from rotating within the housing 1, so that the ribs 4 might pass along the stop shoulders 11, catches (not shown) could for instance be provided after the positioning of the valve body 3.

The housing 1 further comprises a flange 18, whereby the housing can be mounted on a flange of a pipe.

The second closure 9 is spaced from the first closure 8 in the opening direction 7.

As a result, the path of the gas through the valve exhibits only relatively limited changes of direction. Radially outward deflection of the gas flow towards the second closure 9 is accompanied by a further displacement in the opening direction 7 which is substantially parallel to the flow direction of the passage 2, enabling a flowing course of the gas flow.

Owing to the slight resistance experienced by the gas flowing out through the open valve along a path having a flowing course, a high outlet velocity is attained. A concentrated through-flow of the outflowing gas in the environment over a large distance is further promoted in that the egressing gas flow is little turbulent and can hence penetrate far into the environment. Moreover, owing to the limited turbulence in the gas flow, the danger of backfiring of a flame front through the valve is further limited.

During closing of the valve, the path of the still egressing gas depends very little on the position of the valve body 3 in the housing 1. More in particular, during the closing of the valve, the deflection of the gas flow increases very little, if at all, as a result of which there occurs no or very little increase, caused by enhanced deflection of the gas flow, of the force exerted on the valve body 3 in the opening direction 7.

Owing to the staggered positions of the first and the second closure 8, 9 relative to each other in the opening direction 7, the chamber 10 has a relatively great length in the opening direction 7. Hence, the change of volume of the chamber 10 during displacements of the valve body 3 through a particular distance is relatively small. This in turn has the result that during the closing of the valve, with the volume of the chamber 10 decreasing, there occurs no abrupt increase of pressure in this chamber 10 that would promote the rebound of the valve body 3.

Further, owing to the staggered position of the closures 8 and 9 relative to each other in the opening direction 7, the chamber 10 has a relatively large volume. The air in the chamber 10 forms a large buffer providing that the speed of the valve body 3 moving backwards is braked during the closing of the valve. As the chamber 10 has a great length in the opening direction 7, the valve body 3, after the closing of the second closure 9, can be gradually braked over a large range, which prevents the valve body 3 from rebounding. This involves an abrupt rather than gradual reduction of the gas velocity, because as soon as the second closure is closed, the valve is closed so as to be entirely or at least practically gastight.

It is observed that preferably, the second closure 9 in closed condition is not entirely gastight, so that the closing of the first closure 8 is not obstructed by any remaining excess pressure in the chamber 10. In the transitional condition, even a considerable gas flow through the second closure is allowable. It is only important that sufficient pressure be built up below the valve body 3 in order to displace the valve body 3 promptly towards the blow-off position shown in FIG. 3.

Within the framework of the present invention, the second closure can be located both on the outside and on the inside of the housing. For limiting the resistance experienced by the gas flow and for limiting the turbulence, the first and the second closure 8, 9 are preferably each formed by, on the one hand, a closing surface 13 and 14 respectively of the valve body 3, which closing surfaces face radially outwards relative to the opening direction 7, and on the other, cooperating therewith, a seat 15 and 16 respectively in the housing 1, which seats extend radially inwards relative to the opening direction 7. As a result, during blowing off, the gas flow is deflected only to a limited extent.

To cause the first closure 8 to open considerably sooner and more promptly than the second closure, which is favorable for displacing the valve body 3 very promptly towards the blow-off position during opening, it is preferred that the first closure 8 has a conical or flat seat 15, facing the opening direction 7, in the housing 1, and the second closure 9 has a seat 16 in the housing 1 that is parallel to the opening direction 7. This also offers the advantage that the dimensional variations in the opening direction 7 between the seats and the closing surfaces of the first and second closures 8, 9 have no essential influence on the action of the valve.

Also if the seat of the second closure is in fact slightly conical, but directed more parallel to the opening direction 7 than the seat of the first closure, a prompt displacement of the valve body 3 can be achieved.

The valve body 3 has a cross section that gradually increases in the opening direction 7 towards the closing surface 14 of the second closure 9. This further contributes to the limitation of the air resistance experienced by the gas flow in the valve, and to the formation of a strongly concentrated, turbulence-poor, egressing gas flow penetrating in a concentrated form far into the ambient air.

Also the conical construction of the end 17 of the valve body 3, which end is directed in opening direction, supports the formation of a gas flow that, during blowing off, is concentrated and penetrates far into the ambient air.

Owing to the staggered position of the closures 8, 9 in the opening direction 7, the valve according to the example shown has a slender form, with the housing 1 not projecting outside the flange 18. This means that when pipes are being installed, on which pipes the valves according to this embodiment are to be fitted, no additional distance needs to be maintained between adjacent ends of pipes in order to provide room for the valves to be mounted thereon.

The low resistance achieved with a valve according to the invention is illustrated by testing results, wherein with a valve for an ND-100 connecting pipe, at a pressure drop of 0.17 bar, a flow rate of 3000 m²/h was achieved and gas velocities of about 100 m/s were measured. Because an excess pressure above a particular limit involves blowing off at a very high flow rate, this blowing off takes a relatively short time, so that the potentially dangerous situation that may arise during the blowing off of gases from a tank in each case takes an accordingly short time.

Within the framework of the invention, many other embodiments are possible. For instance, the valve body can also be pressed against the opening direction by a different force, such as a spring force or a magnetic force, rather than by means of gravity. Further, the upstream end of the valve body can have a conical form as well, and the passage through the housing can be adapted accordingly, so as to further limit the air resistance in the valve.

What is claimed is:

1. A flame-retardant pressure equalizing valve comprising:
    a housing having an inlet, an outlet opening into the environment in a direction along a longitudinal axis, and passage extending between the inlet and the outlet along the longitudinal axis,
    a valve body moveably disposed in the housing, said valve body being moveable in an opening direction relative to said housing between a closing position and a blow-off position along an axis that is substantially parallel to said longitudinal axis, and
    at least one stop on said housing and at least one stop movable with said valve body;
    wherein the housing and the valve body form a first closure of the passage and, in series therewith, a second closure of the passage with a chamber therein between,
    wherein a surface projected in the opening direction and enclosed by a circumferential edge of the second closure is larger than a surface projected in the opening direction and enclosed by a circumferential edge of the first closure,
    wherein the first and second closures are designed so that if the valve body is in a transitional position located between the closing position and the blow-off position, the first closure is open and the second closure is at least partly closed,
    wherein the second closure is spaced from the first closure in the opening direction,
    wherein the at least one stop on said housing engages the at least one stop movable with the valve body when the valve body is in the blow-off position;
    and wherein the valve body includes an end that projects through and past said outlet and into the environment.

2. A valve according to claim 1, wherein the first and the second closure (9) are each formed by a closing surface (13, 14) of the valve body (3) which closing surface faces radially outwards relative to the opening direction (7), and a seat (15, 16) in the housing (1) cooperating therewith and facing radially inwards relative to the opening direction (7).

3. A valve according to claim 1, wherein the first closure (8) has a conical or flat seat (15) in the housing (1) which seat faces the opening direction (7), and the second closure (9) has a seat (16) in the housing (1) which seat is more parallel to the opening direction (7) than the seat (15) of the first closure (8).

4. A valve according to claim 3, wherein the seat (16) of the second closure (9) extends parallel to the opening direction (7).

5. A valve according to claim 1, wherein the second closure (9) is formed by a closing surface (14) of the valve body (3) and a seat (16) in the housing (1) cooperating therewith, and wherein the valve body (3) has a cross section that, in opening direction (7), gradually increases towards the closing surface.

6. A valve according to according to claim 1, wherein the valve body (3) has an end directed in opening direction (7) that is of conical design.

7. The valve according to claim 1, wherein the end is conical.

8. The valve according to claim 1, wherein said at least one stop on said housing and said valve body are positioned between the first and second closure.

9. The valve according to claim 1, wherein said second closure is not fluid-tight so that fluid can flow through said second closure.

10. The valve according to claim 1, further including a plurality of guides connected to said valve body and contacting an interior surface of said housing to guide said valve body in its movement between the closing position and the blow-off position.

11. The valve according to claim 1, wherein the outlet of said housing is larger than the inlet of said housing.

12. A flame-retardant pressure equalizing valve comprising:
    a housing having an inlet opening, an outlet opening, and a passage extending along a longitudinal axis between the inlet opening and the outlet opening, the outlet opening being larger than the inlet opening;
    structure adjacent one end of said housing for mounting said housing to a fluid containing structure;
    a valve body moveably disposed in the housing, said valve body being moveable relative to said housing between a closing position and a blow-off position, and the movement of said valve body is substantially parallel to said longitudinal axis;
    the housing and the valve body form a first closure of the passage and a second closure of the passage spaced from the first closure with a chamber between the first and second closures, and the second closure is positioned adjacent the outlet opening;
    at least one guide connected to said valve body and contacting a surface of said housing to guide the valve body in its movement between the closing position and the blow-off position;

wherein a surface projected in the opening direction and enclosed by a circumferential edge of the second closure is larger than a surface projected in the opening direction and enclosed by a circumferential edge of the first closure, wherein the first and second closures are designed so that if the valve body is in a transitional position located between the closing position and the blow-off position, the first closure is open and the second closure is at least partly closed, and wherein the valve body includes an end that projects through and past said outlets opening.

13. The valve according to claim 12, further including stops on said housing and on said valve body, said stops on said housing being engaged with said stops on said valve body when said valve body is in the blow-off position.

14. The valve according to claim 13, wherein said stops on said housing and said valve body are positioned between the first closure and the second closure.

15. The valve according to claim 12, wherein said second closure is not fluid-tight so that fluid can flow through said second closure.

16. The valve according to claim 12, wherein the at least one guide includes a plurality of guides connected to said valve body and contacting an interior surface of said housing to guide said valve body in its movement between the closing position and the blow-off position.

* * * * *